United States Patent [19]

Yamazaki et al.

[11] 4,298,720

[45] Nov. 3, 1981

[54] THERMOSETTING RESIN COMPOSITION FROM MALEIMIDE COMPOUND AND ALKENYL PHENOL

[75] Inventors: Noboru Yamazaki; Tsutomu Takase, both of Nagoya; Yoshio Morimoto, Tokai; Teruo Yuasa, Nagoya, all of Japan

[73] Assignee: Mitsui Toatsu Chemicals Incorporated, Tokyo, Japan

[21] Appl. No.: 59,758

[22] Filed: Jul. 23, 1979

[51] Int. Cl.$^3$ ............................................. C08F 22/40
[52] U.S. Cl. ................................. 526/262; 428/473.5; 525/47; 525/445; 526/273; 528/322
[58] Field of Search .................. 526/262, 273; 528/322

[56] References Cited

U.S. PATENT DOCUMENTS 4,100,140  7/1978  Zahir et al. .......................... 526/262

Primary Examiner—Harold D. Anderson

[57] ABSTRACT

Disclosed is a heat-resistant and fast-curing thermosetting resin composition suitably for insulating materials and comprising (a) a bismaleimide and/or a polymaleimide compound and (b) at least one compound selected from alkenylphenol derivatives, linear dimers thereof, and polymers thereof. In addition to components (a) and (b), this resin composition can contain (c) a polymerizable unsaturated compound.

7 Claims, No Drawings

THERMOSETTING RESIN COMPOSITION FROM MALEIMIDE COMPOUND AND ALKENYL PHENOL

BACKGROUND OF THE INVENTION

This invention relates to thermosetting resin compositions having excellent heat resistance and fast-curing properties.

There are a variety of heat-resistant resins which can be used as insulating materials in order to meet the demands for greater capacities, smaller sizes, lighter weights, and higher degrees of reliability of electronic devices and equipments as well as for better heat resistance characteristics, longer service lives, and maintenance-free properties of electrical machinery and apparatus. Among these heat-resistant resins, imide resins of the addition polymerization type, such as bismaleimide resins and aromatic diamine-modified bismaleimide resins, are well known. Such bismaleimide resins have excellent heat resistance, but are not very satisfactory because of the difficulties in processing. The melting points of bismaleimides are high and their curing rates are very low. Moreover, their poor solubility in organic solvents necessitates the use of polar solvents, such as N-methyl-2-pyrrolidone and dimethylformamide, which are unesirable from the viewpoint of environmental pollution. Furthermore, an organic peroxide such as dicumyl peroxide or benzoyl peroxide is usually added to maleimide resins for the purpose of promoting their cure. When such a resin composition is used as impregnating varnish to make prepregs, the cleavage products of the organic peroxide remaining in the prepregs may lead to a reduction in quality and performance of the finally obtained laminates and, especially in the case of copper-clad laminates, to blistering or peeling-off of the copper foil.

It is well known that bismaleimides form a three-dimensional network when they are heated above their melting points or subjected to the action of free radicals. It is also known that the presence of a catalytic amount of a free-radical initiator is desirable for the purpose of achieving an effective crosslinking reaction (see, for example, J. Amer. Chem. Soc., Vol. 81, p. 1187, 1959). By nature, many free-radical initiators have a low activation energy for their decomposition and are unstable and easily decomposable even at room temperature, so that special care must be taken in their storage and handling.

SUMMARY OF THE INVENTION

It is an object of this invention to provide an improved thermosetting resin composition.

It is another object of this invention to provide a thermosetting resin composition which can give a cured product having excellent storage stability, heat resistance, and moisture absorption resistance as well as good electrical and mechanical properties.

It is a further object of this invention to provide an improved thermosetting resin composition which can be used in the manufacture of impregnating resins, adhesives, powder paints and coatings, and molding materials.

It is a still further object of this invention to provide a thermosetting resin composition which, when used in the vulcanization of rubber, can exhibit excellent crosslinking and vulcanization-accelerating effects.

These objects are accomplished by providing a thermosetting resin composition comprising (a) a bismaleimide and/or a polymaleimide compound and (b) at least one compound selected from alkenylphenol derivatives, linear dimers thereof, and polymers thereof.

DETAILED DESCRIPTION OF THE PREFERRED EMBODIMENTS

In accordance with one preferred embodiment of this invention, there is provided a thermosetting resin composition comprising:

(a) at least one maleimide compound selected from the group consisting of bismaleimides having the formula

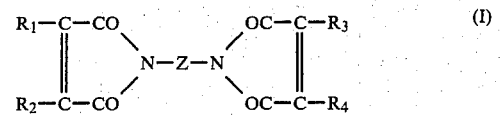

where $R_1$, $R_2$, $R_3$, and $R_4$ are hydrogen atoms, halogen atoms, straight-chain or branched alkyl radicals of from 1 to 10 carbon atoms, phenyl radicals, or substituted phenyl radicals having one or more substituents selected from straight-chain or branched alkyl radicals of from 1 to 10 carbon atoms, halogen atoms, $R_{13}O$—groups in which $R_{13}$ is an aliphatic radical of from 1 to 5 carbon atoms and, if there are two or more radicals represented by $R_{13}$, they may be identical to or different from each other,

groups in which $R_{13}$ is as previously defined, hydroxyl groups, and cyano groups, and the radicals represented by $R_1$, $R_2$, $R_3$, and $R_4$ may be identical to or different from each other, and Z is a divalent organic radical of at least 2 carbon atoms; and polymaleimides having the formula

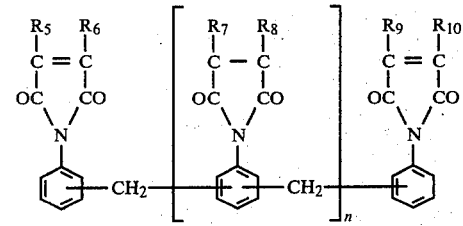

where $R_5$, $R_6$, $R_7$, $R_8$, $R_9$, and $R_{10}$ are hydrogen atoms, halogen atoms, straight-chain or branched alkyl radicals of from 1 to 10 carbon atoms, phenyl radicals, or substituted phenyl radicals having one or more substituents selected from halogen atoms, straight-chain or branched alkyl radicals of from 1 to 10 carbon atoms, $R_{13}O$—groups in which $R_{13}$ is as previously defined,

groups in which $R_{13}$ is as previously defined, hydroxyl groups, and cyano groups, and the radicals represented by $R_5$, $R_6$, $R_7$, $R_8$, $R_9$, and $R_{10}$ may be identical to or different from each other, and n is zero or a positive number; and (b) at least one alkenylphenol derivative selected from the group consisting of compounds having the formula

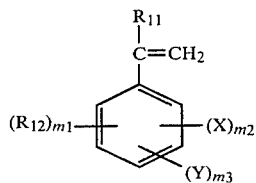

where $R_{11}$ and $R_{12}$ are hydrogen atoms, halogen atoms, straight-chain or branched alkyl radicals of from 1 to 10 carbon atoms, phenyl radicals, or substituted phenyl radicals having one or more substituents selected from halogen atoms, straight-chain or branched alkyl radicals of from 1 to 10 carbon atoms, $R_{13}O$—groups in which $R_{13}$ is as previously defined,

groups in which $R_{13}$ is as previously defined, hydroxyl groups, and cyano groups, and the radicals represented by $R_{11}$ and $R_{12}$ may be identical to or different from each other, X is a hydrogen atom, halogen atom, carboxyl group,

group in which $R_{13}$ is as previously defined, $R_{13}O$— group in which $R_{13}$ is as previously defined, or cyano group, Y is a hydroxyl group, $R_{13}O$—group in which $R_{13}$ is as previously defined, glycidyloxy group, aryloxy group, substituted aryloxy group having one or more substituents selected from halogen atoms and straight-chain or branched alkyl radicals of from 1 to 5 carbon atoms, propargyloxy group, substituted propargyl group having one or more substituents selected from halogen atoms and straight-chain or branched alkyl radicals of from 1 to 5 carbon atoms,

group in which $R_{14}$ is an aliphatic radical of from 1 to 20 carbon atoms, and $m_1$, $m_2$, and $m_3$ are positive integers and the sum of $m_1+m_2+m_3$ has a value of 5; linear dimers thereof; and polymers thereof.

In addition to the aforesaid components (a) and (b), this thermosetting resin composition can contain (c) at least one polymerizable unsaturated compound. The thermosetting resin compositions consisting of components (a), (b), and (c) have more excellent performance than those consisting essentially of components (a) and (b).

A particularly preferred thermosetting resin composition of the invention comprises (a) a bismaleimide of formula (I) in which $R_1$, $R_2$, $R_3$, and $R_4$ are hydrogen atoms, halogen atoms, straight-chain or branched alkyl radicals of from 1 to 5 carbon atoms, or phenyl radicals and the radicals represented by $R_1$, $R_2$, $R_3$, and $R_4$ may be identical to or different from each other, and Z is an organic radical of 2 or more carbon atoms selected from aliphatic, alicyclic, aromatic, and heterocyclic radicals and combinations thereof or a combination of an organic radical as defined above with —O—, —S—, —S—S—, —CO—, —SO—, —SO$_2$—, —CO$_2$—, —N=N—, —NH—, or —CONH—; and/or a polymaleimide of formula (II) in which $R_5$, $R_6$, $R_7$, $R_8$, $R_9$, and $R_{10}$ are hydrogen atoms, halogen atoms, straight-chain or branched alkyl radicals of from 1 to 5 carbon atoms, or phenyl radicals and the radicals represented by $R_5$, $R_6$, $R_7$, $R_8$, $R_9$, and $R_{10}$ may be identical to or different from each other, and n has a value of from 0.1 to 10; and (b) an alkenylphenyl compound of formula (III) in which $R_{11}$ and $R_{12}$ are hydrogen atoms, halogen atoms, straight-chain or branched alkyl radicals of from 1 to 10 carbon atoms, or phenyl radicals and the radicals represented by $R_{11}$ and $R_{12}$ may be identical to or different from each other, X is a hydrogen or halogen atom, Y is a hydroxyl group, $R_{13}O$—group in which $R_{13}$ is as previously defined, glycidyloxy group,

group in which $R_{14}$ is as previously defined, and $m_1$, $m_2$, and $m_3$ are positive integers and the sum of $m_1+m_2+m_3$ has a value of 5.

Specific examples of the radical represented by Z in formula (I) include two or more phenylene or cyclohexylene radicals interconnected either by a simple valence bond or by an atom or inert radical selected, for example, from —O—, —S—, alkylene radicals of from 1 to 3 carbon atoms, —CO—, —SO$_2$—, —NR$_{15}$—, —N=N—, —CONH—, —P(O)R$_{15}$—, —CONH—X$_1$—CONH—,

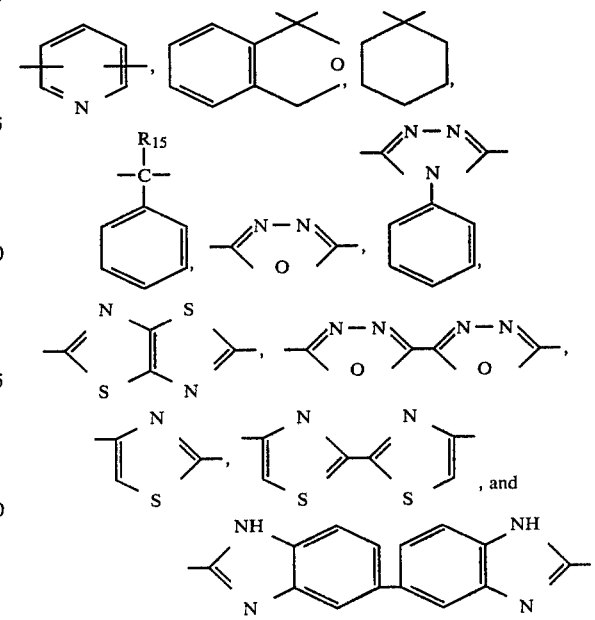

where $R_{15}$ is a hydrogen atom, alkyl radical of from 1 to 4 carbon atoms, phenyl radical, or cyclohexyl radical, and $X_1$ is an alkylene radical of up to 13 carbon atoms.

Each phenylene or cyclohexylene radical may have one or more substituents such as methyl radicals.

The above-defined maleimide compounds are exemplified in the following:

Specific examples of the compounds of formula (I) include N,N'-ethylenebismaleimide, N,N'-ethylenebis(2-methylmaleimide), N,N'-trimethylenebismaleimide, N,N'-tetramethylenebismaleimide, N,N'-hexamethylenebismaleimide, N,N'-1,4-cyclohexylenebismaleimide, N,N'-m-phenylenebismaleimide, N,N'-p-phenylenebismaleimide, N,N'-2,4-tolylenebismaleimide, N,N'-2,6-tolylenebismaleimide, N,N'-(oxydi-p-phenylene)bismaleimide, N,N'-(oxydi-p-phenylene)bis-(2-methylmaleimide), N,N'-(methylenedi-p-phenylene)bismaleimide, N,N'-(methylenedi-p-phenylene)bis(2-methylmaleimide), N,N'-(methylenedi-p-phenylene)bis(2-phenylmaleimide), N,N'-(sulfonyldi-p-phenylene)bismaleimide, N,N'-(thiodi-p-phenylene)bismaleimide, N,N'-(dithiodi-p-phenylene)bismaleimide, N,N'-(sulfonyldi-m-phenylene)bismaleimide, N,N'-(o,p-isopropylidenediphenylene)bis-maleimide, N,N'-(isopropylidenedi-p-phenylene)bismaleimide, N,N'-(o,p-cyclohexylidenediphenylene)bismaleimide, N,N'-(cyclohexylidenedi-p-phenylene)bismaleimide, N,N'-(ethylenedi-p-phenylene)bismaleimide, N,N'-(m-xylylene)bismaleimide, N,N'-(p-xylylene)bismaleimide, N,N'-(4,4''-p-triphenylene)bismaleimide, N,N'-(p-phenylenedioxydi-p-phenylene)bismaleimide, N,N'-(methylenedi-p-phenylene)bis(2,3-dichloromaleimide), and N,N'-(oxydi-p-phenylene)bis(2-chloromaleimide). They further include maleimide-terminated phenoxy compounds having the general formula

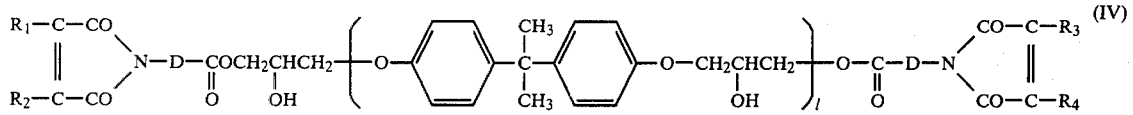

where $R_1$, $R_2$, $R_3$, and $R_4$ are as previously defined for formula (I), D is a divalent organic radical selected from aliphatic, alicyclic, and aromatic radicals, and l is a number having a value of from 0 to 20. Specific examples of the radical represented by D in formula (IV) include methylene, dimethylene, trimethylene, hexamethylene, m-phenylene, and p-phenylene radicals.

Specific examples of the compounds of formula (II) include polymethylene polyphenylene polymaleimides having the formula

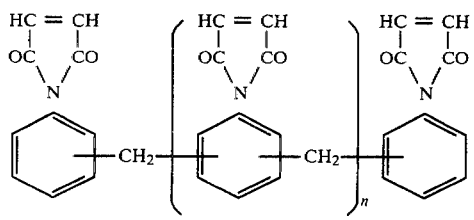

where n is a number having an average value of 0 or greater. These polymaleimides can be obtained by reacting an anilineformaldehyde condensation product of the formula

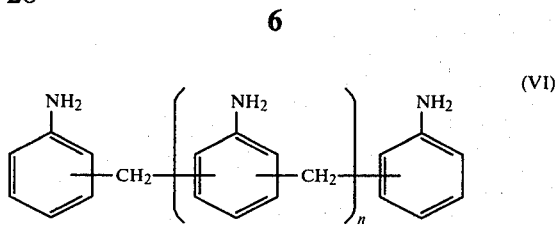

where n is as previously defined, with maleic anhydride according to any conventional procedure. The resulting polymaleimide may contain polymeric by-products having one or more branched structural units of the formula

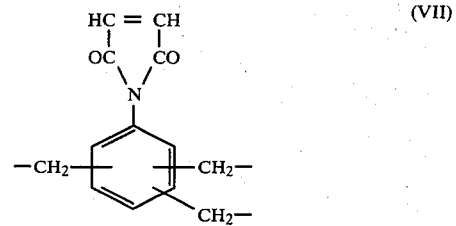

The maleimide compounds of formulas (I) and (II) may be used either alone or in combination.

Specific examples of the alkenylphenol derivatives include vinylphenol (o-, m-, and p-isomers), isopropenylphenol (o-, m-, and p-isomers), vinylcresol, isopropenylcresol, vinylcatechol, isopropenylcatechol, α-ethylvinylphenol, 3,5-dichloro-4-hydroxy-2-methylstyrene, vinylphenyl acetate, isopropenylphenyl acetate, vinylphenyl benzoate, isopropenylphenyl benzoate, vinylphenyl cinnamate, isopropenylphenyl cinnamate, vinylphenyl glycidyl ether, isopropenylphenyl allyl ether, vinylphenyl propargyl ether, isopropenylphenyl propargyl ether, and the like.

The linear dimers of the above-defined alkenylphenyl compounds can be represented by the general formulas

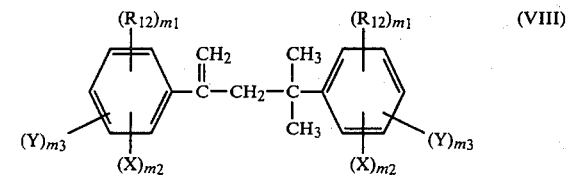

and

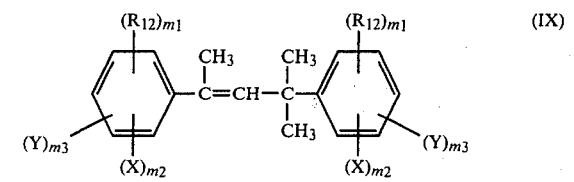

where $R_{12}$, X, Y, $m_1$, $m_2$, and $m_3$ are as previously defined for formula (III). Specific examples of the linear dimers of the above-defined alkenylphenol derivatives include 4-methyl-2,4-bis(2-, 3-, or 4-hydroxyphenyl)-1-pentene or -2-pentene, 4-methyl-2,4-bis(dihydroxyphenyl)-1-pentene or -2-pentene, 4-methyl-2,4-bis(3,5-dichloro-4-hydroxyphenyl)-1-pentene or -2-pentene, 4-methyl-2,4-bis(cresyl)-1-pentene or -2-pentene; the acetic, benzoic, and cinnamic esters of the aforesaid compounds; the glycidyl, allyl, and propargyl ethers of the aforesaid compounds; and the like.

The chemical makeup of the thermosetting resin composition of the invention may vary widely according to the purpose of its use. The weight ratio of the maleimide compound to the alkenylphenyl compound can generally range from 1:1 to 300:1, the preferred range being from 5:1 to 200:1. If the amount of maleimide compound used is below the aforesaid limits, the resin composition as used in the form of a varnish will have a shortened pot life and the cured product will show a lowering of thermal stability or heat resistance, while if it is above the aforesaid limits, the resin composition will show a decrease in curing rate and will have such poor curability that the cured product may fail to achieve sufficient mechanical strength.

The thermosetting resin composition of the invention can contain a polymerizable unsaturated compound in addition to the maleimide compound and the alkenylphenol derivative. The term "polymerizable unsaturated compound" as used herein denotes vinyl monomers, radical-polymerizable unsaturated polymers, and radical-polymerizable unsaturated oligomers. Specific examples of the vinyl monomers include styrene, substituted styrenes having their substituent or substituents on the benzene nucleus, acrylonitrile, acrylic acid and its esters, methacrylic acid and its esters, acrylamide, glycidyl acrylate, glycidyl methacrylate, divinylbenzene, divinyltoluene, diallyl phthalate, triallyl cyanurate, tribromophenyl allyl ether, and the like. Specific examples of the radical-polymerizable unsaturated polymers and oligomers include unsaturated polyester, polybutadiene, polychloroprene, polypentadiene, and diallyl phthalate prepolymer; the foregoing polymers and oligomers modified by the addition of styrene, maleic acid, or epoxy resin; cyclic oligomers such as dicyclopentadiene and cyclododecatriene; terpenoids; and the like. These polymerizable unsaturated compounds may be used either alone or in combination.

The amount of polymerizable unsaturated compound used depends on whether it is a monomer, polymer, or oligomer. However, the ratio of the combined weight of the maleimide compound and the alkenylphenol derivative to the weight of the polymerizable unsaturated compound can generally range from 1:50 to 200:1, the preferred range being from 1:20 to 100:1. If the amount of polymerizable unsaturated compound used is above the aforesaid limits, the cured product will show a lowering of heat resistance and storage stability, while if it is below the aforesaid limits, the fluidity of the resin composition will be too low to exhibit good molding properties.

The thermosetting resin composition of the invention can be cured by application of heat. Although no particular limitation is placed on the curing temperature, the preferred range is from 30° to 300° C. It can also be cured by exposure to radiation such as ultraviolet rays, X rays, alpha rays, beta rays, and gamma rays.

Depending on the purpose of its use, the thermosetting resin composition of the invention can be either mixed with one or more additional components or dissolved in an organic solvent. More specifically, if the resin composition is to be used as a molding material, one or more inorganic fillers such as silica, silica glass, clay, aluminum hydroxide, asbestos, glass fiber, mica, gypsum, kaolin, cement, talc, zinc white, graphite, magnesite, molybdenum disulfide, titanium white, silica sand, carbon black, barium sulfate, and calcium carbonate can be incorporated thereinto. Moreover, a conventional flame retarder such as brominated organic compounds, antimony compounds, and phosphorus compounds can be added to the resin composition for the purpose of imparting flame-retardant properties thereto. If the resin composition is to be used in the form of a solution, it can be dissolved in an organic solvent such as N-methyl-2-pyrrolidone, dimethylformamide, dimethylacetamide, dimethyl sulfoxide, dioxane, acetone, methyl ethyl ketone, tetrahydrofuran, cellosolve, methyl acetate, ethyl acetate, chloroform, benzene, toluene, xylene, and chlorobenzene.

The thermosetting resin composition of the invention can give a cured product having excellent heat resistance, storage stability, and moisture absorption resistance as well as good electrical and mechanical properties, and can bring about an improvement in operating efficiency owing to its good molding and fast-curing properties. Accordingly, it has a wide variety of industrial applications and can be used, for example, in the manufacture of impregnating resins, adhesives, powder paints and coatings, and molding materials. Moreover, when used in the vulcanization of rubber, it can exhibit excellent crosslinking and vulcanization-accelerating effects, thereby imparting improved characteristics, such as very high resistance to heat deterioration, to the vulcanized rubber. Thus, it will be apparent to those skilled in the art that the thermosetting resin composition of the invention is an exceptionally good material having a wide spectrum of functionality.

The present invention is further illustrated by the following examples. In these examples, all parts and percentages are by weight unless otherwise noted.

EXAMPLE 1

To N,N'-(methylenedi-p-phenylene)bismaleimide were added varying amounts of a chemical product (commercially available under the trade name of PARMANOL 200 from Mitsui Toatsu Chemicals, Inc.) consisting of 70% of linear p-isopropenylphenol dimer, 2% of p-isopropenylphenol monomer, 4.3% of linear p-isopropenylphenol trimer, 4.5% of linear p-isopropenylphenol tetramer and higher oligomers, 1.1% of phenol, 0.9% of propylphenol, 3.5% of bisphenol A, and 13.7% of other components. These ingredients were thoroughly mixed at room temperature to form three groups of mixtures. A 1-g aliquot of each mixture was melted on an iron plate preheated to and kept at the temperature specified in Table 1, and then stirred well with a spatula to measure the time required for gelation. The results thus obtained are summarized in Table 1.

TABLE 1

| | PARMANOL (% by weight) | Bismaleimide (% by weight) | Molar Ratio of Bismaleimide PARMANOL 200 | Gelation Temp. (°C.) | Gelation Time (min.) |
|---|---|---|---|---|---|
| 1-1 | 0 | 100 | ∞ | 165 | 50 |
| 1-2 | 10 | 90 | 6.8 | " | 15 |
| 1-3 | 20 | 80 | 3.0 | " | 8.5 |
| 1-4 | 30 | 70 | 1.8 | " | 5.5 |
| 1-5 | 40 | 60 | 1.1 | " | 3 |

TABLE 1-continued

| | PARM-(% by weight) | Bismale-(% by weight) | Molar Ratio of Bismale-imide PARMANOL 200 | Gelation Temp. (°C.) | Gelation Time (min.) |
|---|---|---|---|---|---|
| 1-6 | 50 | 50 | 0.76 | " | 2 |
| 2-1 | 0 | 100 | ∞ | 180 | 17.5 |
| 2-2 | 4 | 96 | 15.2 | " | 8 |
| 2-3 | 9 | 91 | 7.6 | " | 5 |
| 2-4 | 17 | 83 | 3.8 | " | 3 |
| 2-5 | 33 | 67 | 1.5 | " | 2.5 |
| 2-6 | 41 | 59 | 0.8 | " | >1 |
| 3-1 | 0 | 100 | ∞ | 200 | 6 |
| 3-2 | 10 | 90 | 6.8 | " | 2 |
| 3-3 | 20 | 80 | 3.0 | " | 2 |
| 3-4 | 30 | 70 | 1.8 | " | 1.7 |
| 3-5 | 40 | 60 | 1.1 | " | 1.5 |
| 3-6 | 50 | 50 | 0.76 | " | 0.8 |

EXAMPLE 2

To 0.1 mole of N,N'-(methylenedi-p-phenylene)bismaleimide was added 0.2 mole of p-isopropenylphenyl acetate. These ingredients were thoroughly mixed, and a 1-g aliquot of the resulting mixture was melted on an iron plate preheated to and kept at 160° C. As a result, the gelation time was found to be 60 seconds. When used alone, the bismaleimide did not gel even after 60 minutes' heating.

EXAMPLE 3

The procedure of Example 2 was repeated except that the p-isopropenylphenyl acetate was replaced by p-isopropenylphenyl benzoate. As a result, the gelation time was found to be 70 seconds.

EXAMPLE 4

The procedure of Example 2 was repeated except that the p-isopropenylphenyl acetate was replaced by p-isopropenylphenyl cinnamate. As a result, the gelation time was found to be 100 seconds.

EXAMPLE 5

An intimate mixture of 10 g of styrene, 7 g of N,N'-(methylenedi-p-phenylene)bismaleimide, and 1.5 g of p-isopropenylphenol was prepared. Upon heating at 120° C., it cured in 35 minutes. When styrene was used alone, little polymerization product was noted even after 3 hours' heating at that temperature. Moreover, a mixture of styrene and the aforesaid bismaleimide showed similar unsuccessful resutls.

EXAMPLE 6

A resin composition (commercially available under the trade name of ESTAR XE7472 from Mitsui Toatsu Chemicals, Inc.) consisting of about 55% of unsaturated polyester, about 45% of styrene, and 0.02% of hydroquinone was allowed to cure with or without an accelerator. The accelerator used was a mixture of N,N'-(methylenedi-p-phenylene)bismaleimide and Parmanol 200 or p-isopropenylphenol. The results thus obtained are summarized in Table 2.

TABLE 2

| | ESTAR XE7472 (g) | Bismale-imide (g) | Alkenylphenol | | Curing Temperature (°C.) | Curing Time (min.) |
|---|---|---|---|---|---|---|
| 1-1 | 6.0 | 0.8 | PAR-MANOL 200 | 0.2 | 200 | 2.5 |
| 1-2 | " | 0.9 | PAR-MANOL 200 | 0.1 | " | 3.5 |
| 1-3 | " | — | — | — | " | >30 |
| 2-1 | 7.0 | 1.0 | p-Isopropenyl-phenol | 0.13 | 120 | 15 |
| 2-2 | " | 1.0 | PAR-MANOL 200 | 0.2 | " | 17.5 |
| 2-3 | " | — | — | — | " | >180 |

EXAMPLE 7

The procedure of Example 2 was repeated except that the p-isopropenylphenyl acetate was replaced by p-isopropenylphenyl allyl ether. As a result, the gelation time was found to be 80 seconds.

EXAMPLE 8

The procedure of Example 2 was repeated except that the p-isopropenylphenyl acetate was replaced by p-isopropenylphenyl glycidyl ether. As a result, the gelation time was found to be 70 seconds.

EXAMPLE 9

An intimate mixture of 10 g of liquid polybutadiene (commercially available under the trade name of NISSO-PB G-1000 from Nippon Soda Company, Limited), 10 g of styrene, 7 g of N,N'-(methylenedi-p-phenylene)-bismaleimide, and 2.0 g of p-isopropenylphenyl acetate was prepared. Upon heating at 120° C., it cured in 28 minutes.

EXAMPLE 10

An intimate mixture of 10 g of liquid polybutadiene (commercially available under the trade name of NEW POLYOIL NX-5 from Nippon Zeon Co., Ltd.), 10 g of styrene, 7 g of N,N'-(methylenedi-p-phenylene)bismaleimide, and 2.1 g of p-isopropenylphenyl acetate was prepared. Upon heating at 120° C., it cured in 34 minutes.

EXAMPLE 11

An intimate mixture of 0.90 g of p-isopropenylphenol and 10.74 g of a poly(methylene polypheneylene polymaleimide of formula (V) in which n had an average value of 0.8 was prepared. Thus, the aforesaid polymaleimide is represented by the formula

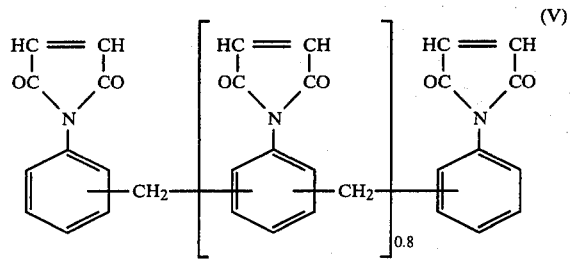

(V)

Upon heating at 150° C., this mixture cured in 86 seconds. When the aforesaid polymaleimide alone was heated at that temperature, the curing time was as long as 32 minutes.

What is claimed is:

1. A thermosetting resin composition comprising:
(a) at least one maleimide compound selected from the group consisting (i) bismaleimides having the formula

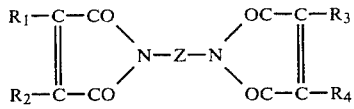

where $R_1$, $R_2$, $R_3$, and $R_4$ are the same or different from each other and are: hydrogen atoms; or halogen atoms; or straight-chain or branched alkyl radicals of from 1 to 10 carbon atoms; or phenyl radicals; or substituted phenyl radicals having one or more substituents selected from the straight-chain or branched alkyl radicals of from 1 to 10 carbon atoms, halogen atoms, $R_{13}O$—groups in which $R_{13}$ is an aliphatic radical of from 1 to 5 carbon atoms, and, when there are two or more radicals represented by $R_{13}$, said radicals are identical to or different from each other,

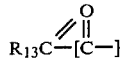

groups in which $R_{13}$ is as previously defined, hydroxyl groups, or cyano groups; and Z is a divalent organic radical of at least 2 carbon atoms; and
(ii) polymaleimides having the formula

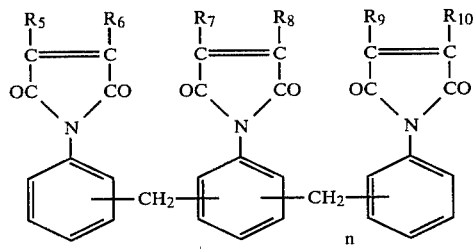

where $R_5$, $R_6$, $R_7$, $R_8$, $R_9$, and $R_{10}$ are the same or different from each other and are hydrogen atoms; or halogen atoms; or straight-chain or branched alkyl radicals of from 1 to 10 carbon atoms; or phenyl radicals; or substituted phenyl radicals having one or more substituents selected from halogen atoms, straight-chain or branched alkyl radical of from 1 to 10 carbon atoms, $R_{13}O$—groups in which $R_{13}$ is as previously defined,

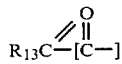

groups in which $R_{13}$ is as previously defined, hydroxyl group, or cyano groups; and n is zero or a positive number; and
(b) at least one alkenylphenol derivative selected from the groups consisting of compounds having the formula

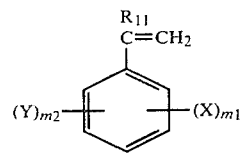

where $R_{11}$ is a hydrogen atom; or halogen atom; or straight-chain or branched alkyl radical of from 1 to 10 carbon atoms; or phenyl radical; or substituted phenyl radical having one or more substituents selected from halogen atoms, straight-chain or branched alkyl radicals of from 1 to 10 carbon atoms, $R_{13}O$—groups in which $R_{13}$ is as previously defined,

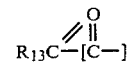

groups in which $R_{13}$ is as previously defined, hydroxyl groups, or cyano groups; X is a hydrogen atom; or a halogen atom; or a carboxyl group; or an

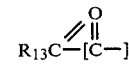

group in which $R_{13}$ is as previously defined; or a $R_{13}O$—group in which $R_{13}$ is as previously defined; or a cyano group; Y is a hydroxyl group; or a $R_{13}O$—group in which $R_{13}$ is as previously defined; or a glycidyloxy group; or an aryloxy group; or a substituted aryloxy group having one or more substituents selected from halogen atoms or straight-chain or branched alkyl radicals of from 1 to 5 carbon atoms; or a propargyloxy group; or a substituted propargyloxy group having one or more substituents selected from halogen atoms or straight-chain or branched alkyl radicals of from 1 to 5 carbon atoms; or an

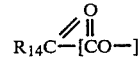

group in which $R_{14}$ is an aliphatic radical of from 1 to 20 carbon atoms; or an aromatic radical; and $m_1$ and $m_2$ are positive integers and the sum of $m_1 + m_2$ has the value of 5.

2. The thermosetting resin composition according to claim 1 wherein $R_1$, $R_2$, $R_3$, and $R_4$ are equal or different and are hydrogen atoms; or halogen atoms; or straight-chain or branched alkyl radicals of from 1 to 5 carbon atoms; phenyl radicals; and Z is either an organic radical of 2 or more carbon atoms selected from aliphatic, alicyclic, aromatic, or heterocyclic radicals or combinations thereof; or a combination of an organic radical as defined above with —O—, —S—, —S—S—, —CO—, —SO—, —SO$_2$—, —CO$_2$—, —N=N—, —NH—, or —CONH—; $R_5$, $R_6$, $R_7$, $R_8$, $R_9$, and $R_{10}$ are equal or different and are hydrogen atoms; or halogen atoms; or straight-chain or branched alkyl radicals of from 1 to 5 carbon atoms; or phenyl radicals; and n has a value of from 0.1 to 10; and further wherein $R_{11}$ is a hydrogen atom; or halogen atom; or straight-chain or branched alkyl radical of from 1 to 10 carbon atoms; or phenyl, radical; X is a hydrogen or halogen atom; Y is a hydroxyl group; or a $R_{13}O$—group wherein $R_{13}$ is as previously defined; or a glycidyloxy group; or a $R_{14}CO$—group wherein $R_{14}$ is as previously defined; and $m_1$ and $m_2$ are positive integers and the sum of $m_1+m_2$ has a value of 5.

3. The thermosetting resin composition according to claim 1 wherein the maleimide compound is N,N'-(methylenedi-p-phenylene)-bismaleimide.

4. The thermosetting resin composition according to claim 1 wherein the maleimide compound is a polymaleimide in which n has a value of from 0.3 to 3.

5. The thermosetting resin composition according to claim 1 wherein the alkenylphenol compound is a p-isopropenylphenol or a linear dimer thereof.

6. The thermosetting resin composition according to claim 1 wherein the weight ratio of the maleimide compound to the alkenylphenol compound ranges from 1:1 to 300:1.

7. The thermosetting resin composition according to claim 1 wherein the maleimide compound is at least one compound selected from the group consisting of N,N'-(methylenedi-p-phenylene)-bismaleimide and polymaleimides having the formula

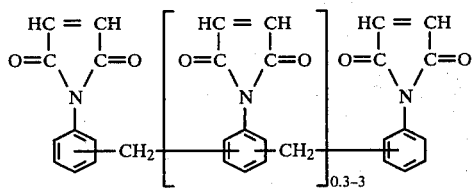

and the alkenyphenol derivative is at least one compound selected from the group consisting of p-isopropenylphenol and linear dimers thereof, the weight ratio of the maleimide compound to the alkenylphenol compound ranging from 1:1 to 300:1.

* * * * *